(12) United States Patent
Bax et al.

(10) Patent No.: US 12,423,509 B2
(45) Date of Patent: Sep. 23, 2025

(54) AUTOMATED CITATIONS AND ASSESSMENT FOR AUTOMATICALLY GENERATED TEXT

(71) Applicant: YAHOO ASSETS LLC, New York, NY (US)

(72) Inventors: Eric Bax, Sierra Madre, CA (US); Arundhyoti Sarkar, Mountlake Terrace, WA (US); Melissa Gerber, Mission Viejo, CA (US); Will Wagner, Costa Mesa, CA (US); Lisa Giaffo, Pasadena, CA (US); Nikki Thompson, Bloomfield, NJ (US)

(73) Assignee: YAHOO ASSETS LLC, New York, NY (US)

( * ) Notice: Subject to any disclaimer, the term of this patent is extended or adjusted under 35 U.S.C. 154(b) by 209 days.

(21) Appl. No.: 18/345,508

(22) Filed: Jun. 30, 2023

(65) Prior Publication Data
US 2025/0005266 A1  Jan. 2, 2025

(51) Int. Cl.
G06F 40/169 (2020.01)
G06F 16/35 (2019.01)
G06F 16/38 (2019.01)
G06F 40/205 (2020.01)

(52) U.S. Cl.
CPC ............ *G06F 40/169* (2020.01); *G06F 16/35* (2019.01); *G06F 16/382* (2019.01); *G06F 40/205* (2020.01)

(58) Field of Classification Search
None
See application file for complete search history.

(56) References Cited

U.S. PATENT DOCUMENTS 9,483,582 B2* 11/2016 Gaucher ........... G06F 16/90332
2022/0101873 A1* 3/2022 Burmistrov ............ G06F 3/167
2024/0256764 A1* 8/2024 Maschmeyer ...... G06F 16/3328

* cited by examiner

*Primary Examiner* — Tuan S Nguyen
(74) *Attorney, Agent, or Firm* — James J. DeCarlo; Greenberg Traurig, LLP (57) ABSTRACT

In some implementations, the techniques described herein relate to a method including: parsing, by a processor, a generated text to identify statements included within a generated text; querying, by the processor, a remote data source to identify sources for each statement in the statements; determining, by the processor, trustworthiness values for each statement, a trustworthiness value for a given statement determined by computing trustworthiness labels for each source corresponding to a given statement: generating, by the processor, a label for the generated text based on an aggregated trustworthiness of each of the statements; and displaying, by the processor, the generated text and the label within a user interface displayed to a user.

18 Claims, 5 Drawing Sheets

AUTOMATED CITATIONS AND ASSESSMENT FOR AUTOMATICALLY GENERATED TEXT

BACKGROUND

As computer programs that produce text become more sophisticated and complex, it is increasingly difficult to trace the origins of the information in the text. As a result, it is difficult to determine whether the information is factual, whether it can be found in other sources that are known to be factual or false, or whether it is synthesized in such a way that it has no supporting sources among a large body of other texts, possibly due to being fabricated by the computer program.

DETAILED DESCRIPTION

Various machine learning (ML) and artificial intelligence (AI) models are capable of generating text. One example of such a model is a large language model (LLM). An LLM is a statistical model that predicts the next word in a sequence, given the previous words (often referred to as a "prompt"). LLMs are trained on massive datasets of text, and can be used for a variety of tasks, such as text generation, translation, and question answering. LLMs are typically composed of a neural network with many parameters (typically billions of weights or more). The neural network is trained on a large dataset of text and learns to predict the next word in a sequence, given the previous words. While LLMs are used primarily in the following description, the embodiments described herein can apply equally to other types of text generation models including, but not limited to, long short-term memory (LSTM) models, recurrent neural networks (RNNs), encoder-decoder models, transformer-based models, specialized convolutional neural networks (CNNs) etc.

While such models can produce readable content, the models are frequently subject to "hallucinations." An LLM hallucination is a confident response by an AI (e.g., an LLM) that does not seem to be justified by its training data, either because it is insufficient, biased or too specialized. LLMs can sometimes generate text that is nonsensical or unfaithful to the provided source content. There are a number of reasons why LLMs can hallucinate. One reason is that the training data may be insufficient or biased. For example, if an LLM is trained on a dataset of text that only contains positive reviews, it may be more likely to generate positive reviews when asked to write a review. Another reason why LLMs can hallucinate is that they can be too specialized. For example, an LLM that is trained on a dataset of medical text may be more likely to generate medical jargon when asked to write about a non-medical topic. LLM hallucinations can be a problem because they can lead to the spread of misinformation, expose confidential information, and create unrealistic expectations about what LLMs can do.

The example embodiments describe methods, computer-readable media, device, and systems that can take a generated text as input and search among a set of texts for sources that support the information in the generated text. Some texts in the set of texts may be labeled for veracity or trustworthiness. The sources may be used to annotate the generated text with citations and to label information in the input text as having no support among the set of texts, support from trustworthy sources, support from untrustworthy sources, or support from sources with unknown trustworthiness.

In some implementations, the techniques described herein relate to a method including: parsing, by a processor, a generated text to identify statements included within a generated text; querying, by the processor, a remote data source to identify sources for each statement in the statements; determining, by the processor, trustworthiness values for each statement, a trustworthiness value for a given statement determined by computing trustworthiness labels for each source corresponding to a given statement: generating, by the processor, a label for the generated text based on an aggregated trustworthiness of each of the statements; and displaying, by the processor, the generated text and the label within a user interface displayed to a user.

In some implementations, the techniques described herein relate to a method, further including generating the generated text by inserting a prompt into a large language model (LLM).

In some implementations, the techniques described herein relate to a method, wherein identifying the statements included within the generated text includes: parsing the generated text into a set of sentences; filtering the set of sentences to identify a second set of sentences that includes informational content; and using the second set of sentences as the statements.

In some implementations, the techniques described herein relate to a method, wherein identifying the statements included within the generated text includes performing co-reference resolution on the generated text prior to parsing the generated text.

In some implementations, the techniques described herein relate to a method, wherein identifying a given source in the sources includes using a corresponding statement as a search query and querying a search engine to obtain a list of search results, the list of search results including the sources.

In some implementations, the techniques described herein relate to a method, wherein determining trustworthiness values of each statement includes: classifying a trustworthiness of each source in sources corresponding to the given statement; scoring and sorting the sources corresponding to the given statement; selecting a top subset of the sources; and determining a given trustworthiness value of the given statement based on classified trustworthiness values of each source in the top subset of the sources.

In some implementations, the techniques described herein relate to a method, wherein selecting a top subset of the sources includes performing an entailment analysis using the given statement and a respective source.

In some implementations, the techniques described herein relate to a method, further including: displaying statement labels for each of the statements, the statement labels representing trustworthiness of each of the statements; and detecting a selection of a given statement label and displaying a corresponding list of sources.

In some implementations, the techniques described herein relate to a non-transitory computer-readable storage medium for tangibly storing computer program instructions capable of being executed by a computer processor, the computer program instructions defining steps of: parsing a generated text to identify statements included within a generated text; querying a remote data source to identify sources for each statement in the statements; determining trustworthiness values for each statement, a trustworthiness value for a given statement determined by computing trustworthiness labels for each source corresponding to a given statement: generating a label for the generated text based on an aggregated trustworthiness of each of the statements; and displaying the generated text and the label within a user interface displayed to a user.

In some implementations, the techniques described herein relate to a non-transitory computer-readable storage medium, the steps further including generating the generated text by inserting a prompt into a large language model (LLM).

In some implementations, the techniques described herein relate to a non-transitory computer-readable storage medium, wherein identifying the statements included within the generated text includes: parsing the generated text into a set of sentences; filtering the set of sentences to identify a second set of sentences that includes informational content; and using the second set of sentences as the statements.

In some implementations, the techniques described herein relate to a non-transitory computer-readable storage medium, wherein identifying the statements included within the generated text includes performing co-reference resolution on the generated text prior to parsing the generated text.

In some implementations, the techniques described herein relate to a non-transitory computer-readable storage medium, wherein identifying a given source in the sources includes using a corresponding statement as a search query and querying a search engine to obtain a list of search results, the list of search results including the sources.

In some implementations, the techniques described herein relate to a non-transitory computer-readable storage medium, wherein determining trustworthiness values of each statement includes: classifying a trustworthiness of each source in sources corresponding to the given statement; scoring and sorting the sources corresponding to the given statement; selecting a top subset of the sources; and determining a given trustworthiness value of the given statement based on classified trustworthiness values of each source in the top subset of the sources.

In some implementations, the techniques described herein relate to a non-transitory computer-readable storage medium, wherein selecting a top subset of the sources includes performing an entailment analysis using the given statement and a respective source.

In some implementations, the techniques described herein relate to a non-transitory computer-readable storage medium, the steps further including: displaying statement labels for each of the statements, the statement labels representing trustworthiness of each of the statements; and detecting a selection of a given statement label and displaying a corresponding list of sources.

In some implementations, the techniques described herein relate to a device including: a processor; and a storage medium for tangibly storing thereon logic for execution by the processor, the logic including instructions for: parsing a generated text to identify statements included within a generated text; querying a remote data source to identify sources for each statement in the statements; determining trustworthiness values for each statement, a trustworthiness value for a given statement determined by computing trustworthiness labels for each source corresponding to a given statement: generating a label for the generated text based on an aggregated trustworthiness of each of the statements; and displaying the generated text and the label within a user interface displayed to a user.

In some implementations, the techniques described herein relate to a device, wherein identifying the statements included within the generated text includes: parsing the generated text into a set of sentences; filtering the set of sentences to identify a second set of sentences that includes informational content; and using the second set of sentences as the statements.

In some implementations, the techniques described herein relate to a device, wherein identifying a given source in the sources includes using a corresponding statement as a search query and querying a search engine to obtain a list of search results, the list of search results including the sources.

In some implementations, the techniques described herein relate to a device, wherein determining trustworthiness values of each statement includes: classifying a trustworthiness of each source in sources corresponding to the given statement; scoring and sorting the sources corresponding to the given statement; selecting a top subset of the sources by performing an entailment analysis using the given statement and a respective source; and determining a given trustworthiness value of the given statement based on classified trustworthiness values of each source in the top subset of the sources.

Figure 1:
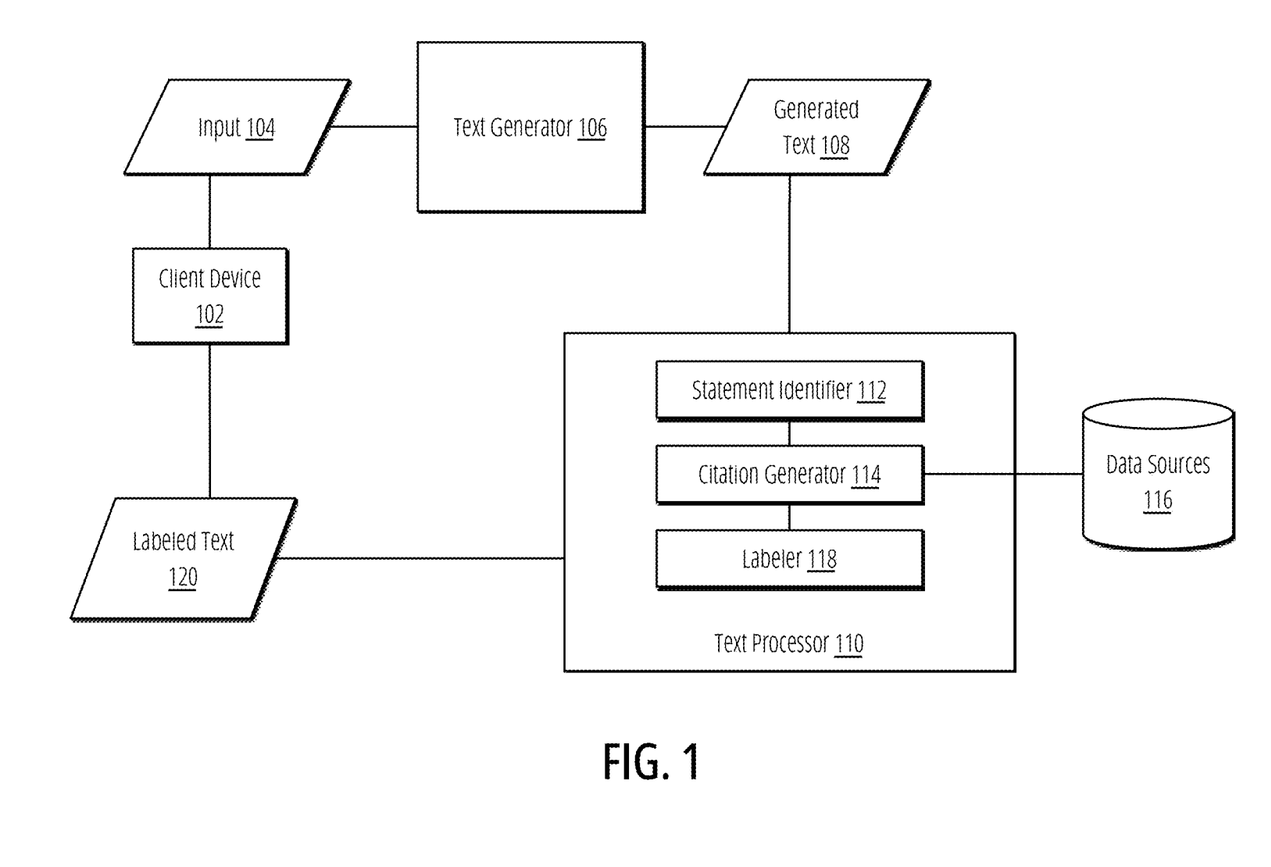
FIG. 1 is a block diagram illustrating a system for generating citations for automatically generated text according to some of the example embodiments.

FIG. 1 is a block diagram illustrating a system for generating citations for automatically generated text according to some of the example embodiments.

The illustrated system includes a client device 102. Client device 102 may generate input 104 and provide this input 104 to a text generator 106. The text generator 106 can create a generated text 108 from the input 104. The generated text 108 can then be fed into a text processor 110. The text processor 110 includes a statement identifier 112 to identify statements, a citation generator 114 to query data sources 116 to identify sources for each statement, and a labeler 118 to label both the statements and the entire generated text for trustworthiness. The output of text processor 110 comprises labeled text 120 which can be displayed on client device 102. Further details of these components are described herein and in the following flow diagrams.

In the various implementations, client device 102, text generator 106, and text processor 110 can be implemented using various types of computing devices such as laptop/desktop devices, mobile devices, server computing devices, etc. Specific details of the components of such computer devices are provided in the description of FIG. 5 which are not repeated herein. In general, these devices can include a processor and a storage medium for tangibly storing thereon logic for execution by the processor. In some implementations, the logic can be stored on a non-transitory computer readable storage medium for tangibly storing computer program instructions. In some implementations, these instructions can implement some of all of the methods described in FIG. 2 through FIG. 4.

In some implementations, the input 104 can comprise a prompt and text generator 106 may comprise an AI/ML model such as an LLM. No limit is placed on the content of a prompt and indeed any form of prompt may be used. In some implementations, the prompt can take the form of a direction or command such as "please provide some examples of large language models." Other types of input prompts may be used. The text generator 106 can use this prompt (if provided) to generate freeform text (i.e., generated text 108) that is generated based on the input 104. Specific details on how an AI/ML model (e.g., GPT-3, GPT-4, LLAMA, etc.) are not described in detail herein and, indeed, any text generation model can be used.

As illustrated, in existing systems, generated text 108 would be provided directly to client device 102. However, as illustrated, generated text 108 is post-processed using a text processor 110. In brief, text processor 110 can validate the trustworthiness of generated text 108. Notably, the use of text processor 110 occurs after the operations of text generator 106 and is thus applicable to many types of models. As such, the system does not require modification (which is time-consuming) of the underlying AI/ML text generation model used by text generator 106.

Figure 2:
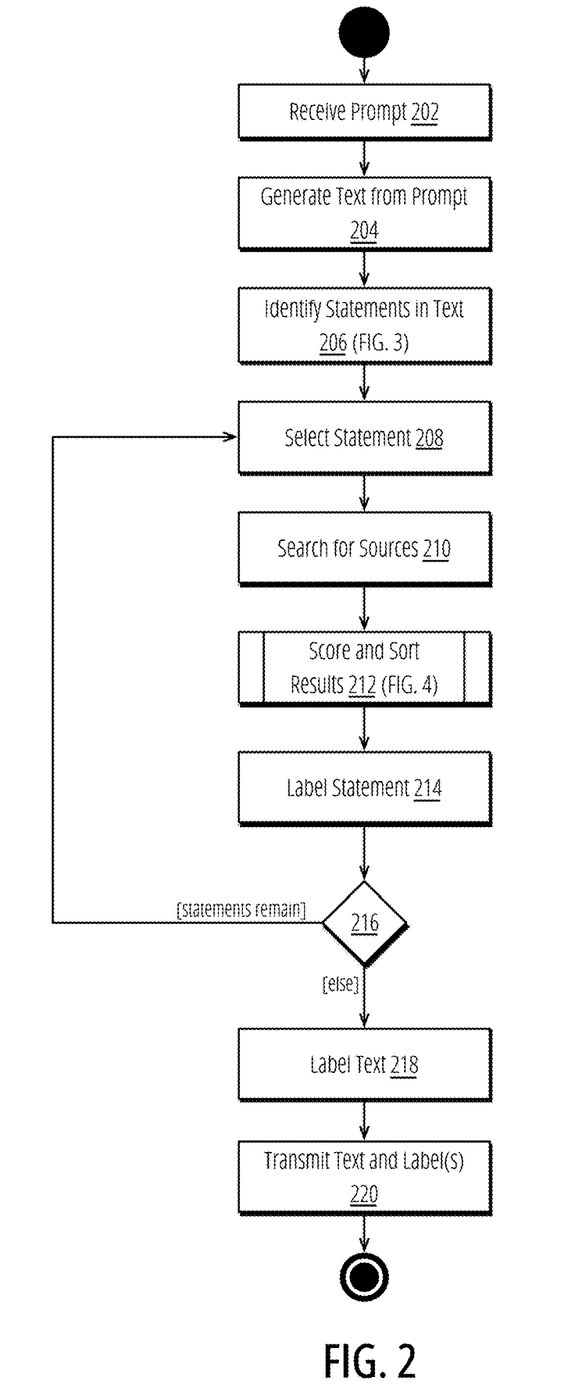
FIG. 2 is a flow diagram illustrating a method for generating citations for automatically generated text according to some of the example embodiments.
Figure 3:
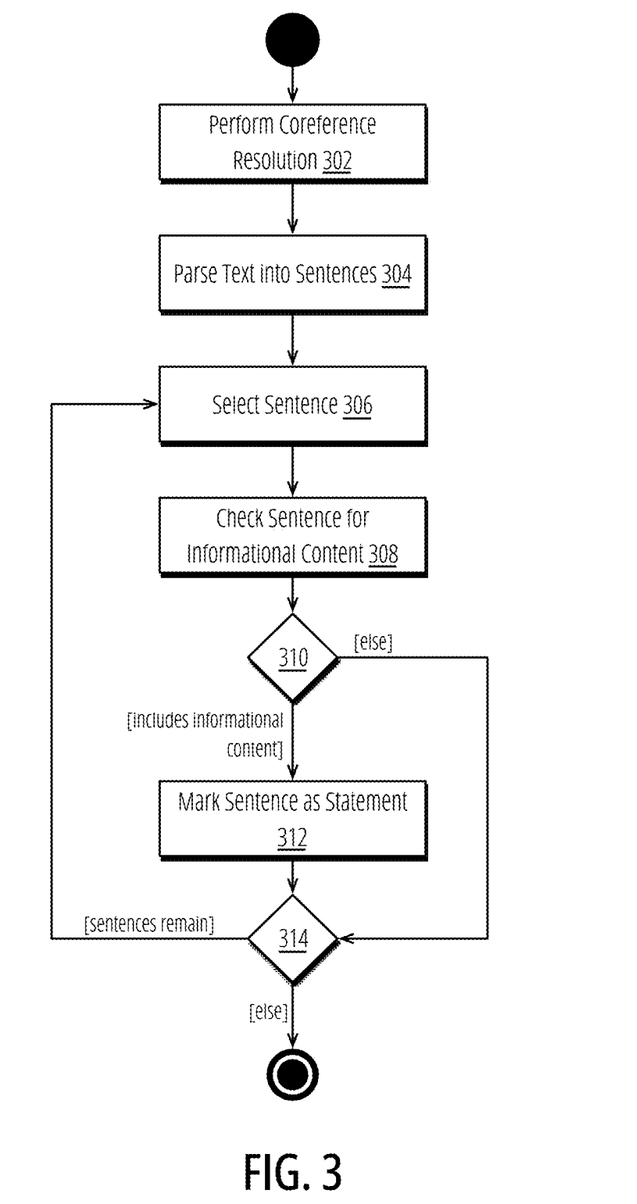
FIG. 3 is a flow diagram illustrating a method for identifying statements in an automatically generated text according to some of the example embodiments.
Figure 4:
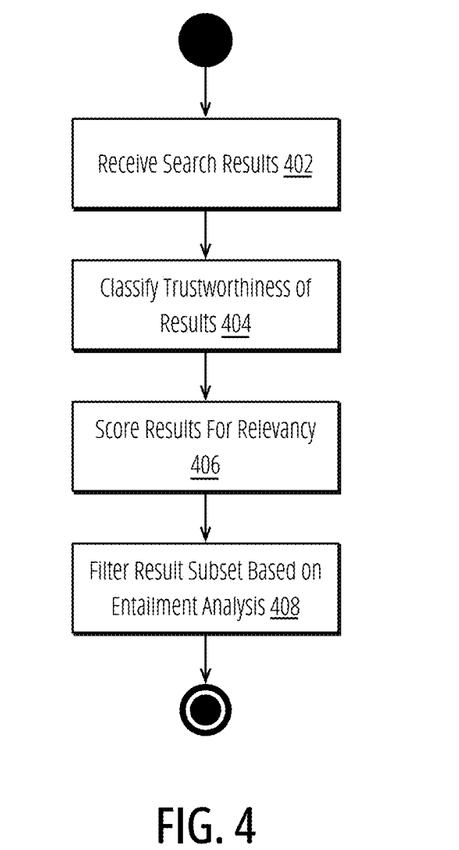
FIG. 4 is a flow diagram illustrating a method for identifying citations based on a statement in an automatically generated text according to some of the example embodiments.

Details of the functions of text processor 110 are provided in the flow diagrams of FIGS. 2 through 4 and are only described briefly herein. Reference is made to those descriptions for a more completely description of the operations therein. In brief, text processor 110 first identifies statements within a generated text 108 via statement identifier 112. Statement identifier 112 can resolve references (e.g., pronouns, anaphoras, etc.) in generated text 108, split generated text 108 into sentences, and identify those sentences that include information content as statements.

Next, citation generator 114 can analyze each identified statement to identify sources or citations for each statement. As illustrated citation generator 114 can query data sources 116 which may comprise public search engines, private data stores, or curated data stores. In some implementations, citation generator 114 can use each statement as a query to data sources 116 and can receive a set of results from data sources 116 as candidate sources. In some implementations, citation generator 114 can further be configured to classify the trustworthiness of each source, score each source based on its relevancy to the statement, and sort the sources by score. A top subset of these sources can then be used as the citations for a given statement.

Labeler 118 then receives the statements and potential sources and then labels each statement as trustworthy, untrustworthy, or unknown based on an aggregation of the individual trustworthiness scores for each source. In some implementations, the labeler 118 can proactively remove untrustworthy statements from the statement list and, in some implementations, regenerate the text using text generator 106 with an instruction to remove the untrustworthy statements.

Finally, the text processor 110 can provide the labeled text 120 to the client device 102. In some implementations, the client device 102 can display a UI that presents the generated text and the overall label. In some implementations, the UI can also include controls or other UI elements to allow users to view the citations (and individual trustworthiness scores). In some implementations, the UI allows the user to remove citations and/or statements completely from the generated text and to, in some implementations, re-generate text similar to that described previously.

FIG. 2 is a flow diagram illustrating a method for generating citations for automatically generated text according to some of the example embodiments.

In step 202, the method can include receiving a prompt.

In some implementations, the prompt comprises user-generated text. Specifically, a user may enter any free form text into a text box or other user interface (UI) element. No limit is placed on the content of a prompt and indeed any form of prompt may be used. In some implementations, the prompt can take the form of a direction or command such as "please provide some examples of large language models." Other types of input prompts may be used. In some implementations, step 202 may be optional, and an AI/ML model may be triggered to generate text in other manners, as such the use of a prompt is non-limiting but commonly used for LLMs and similar models. While text prompts are described, other types of prompting may be used. For example, image, video, or audio prompts may also be used. In some implementations, these multimedia prompts can be converted to text (e.g., via voice-to-text) while in other embodiments, a multi-modal model can be used that supports non-text prompt inputs.

In step 204, the method can include generating text from the prompt.

In some implementations, the method can include inputting the prompt into a model such as an LLM. The specific operations of the LLM (or similar model) are not limiting and, indeed, any text generation model can be used, provided it outputs data. In some implementations, the output of the model may be the generated text itself. In other implementations, the output can comprise another media type (e.g., audio, video, image). In some implementations, the output of the model may comprise multiple types (e.g., text with an associated image, audio, for video file). In general, however, the model will produce either text or another media format that can be readily converted into a textual representation (e.g., audio transcription, video transcription/summarization, image description, optical character recognition, etc.).

In step 206, the method can include identifying statements in the generated text.

In some implementations, the text generated in step 204 can comprise freeform text. As such, the text may comprise a paragraph, or multiple paragraphs, of unstructured text. In such a scenario, the generated text may include one or more "statements." As used herein, a statement refers to an assertion in the generated text. In some scenarios, a sentence may align 1:1 with a statement (e.g., "Abraham Lincoln was a U.S. president"). However, in other scenarios, statements may not necessarily map 1:1 with sentences. For example, the sentence "Abraham Lincoln led the country through the American Civil War and is credited with abolishing slavery," includes two statements: "Abraham Lincoln led the country through the American Civil War" and "Abraham Lincoln is credited with abolishing slavery." Further, some sentences may include no statements. For example, the introductory sentence, "Sure, below is a brief biography of Abraham Lincoln" does not include any actionable assertions.

Various mechanisms can be used to detect statements within generated text. As one example, the generated text can itself be fed into an LLM with a prompt template that requests the LLM identify assertions. For example, the following prompt template can be used:

Given the following text:
<<generated text>>
Identify a list of statements or assertions present within the text. Provide the list as a JSON array of string values only (example: ["statement 1", "statement 2," . . . ]).

Here, "<<generated text>>" refers to the text generated in step 204. As illustrated, the LLM may be guided to output its results in a processible format (JavaScript Object Notation, JSON). Further prompt text can be included such as to resolve pronouns, anaphoras, and references (e.g., "Please resolve all pronouns, anaphoras, and references before generating the JSON output."). Such a prompt may, for example, output the following three statements:

```
[
"Abraham Lincoln was the 16th president of the United States.",
"Abraham Lincoln led the country through the American Civil War.",
"Abraham Lincoln is credited with
abolishing slavery in the United States."
]
```

Alternatively, various natural language programming (NLP) approaches can be used to parse statements from generated text. In some implementations, the use of NLP may be used to increase speed and accuracy when compared to using LLMs, although both are suitable options for identifying statements. Examples of using NLP to identify statements are described more fully in the description of FIG. 4 and not repeated herein.

In step 208, the method can include selecting a statement from the statements identified in step 206. As discussed, the output of step 206 can comprise a list of statements (ordered or unordered). As such, in step 208, the method can include selecting each statement sequentially and proceeding to step 210. Alternatively, in some implementations, the method can execute step 210 and step 212 in parallel for each statement. For example, parallel processes or threads can be used to process each statement independently and simultaneously. In such an implementations, step 208 and step 214 may be omitted while step 210 and step 212 are executed in parallel.

In step 210, the method can include searching for sources for the statement selected in step 208.

In some implementations, searching for sources can include using a given statement as a search query. In some implementations, the method can include providing the search query (i.e., statement) to an information source which returns search results. For example, the information source may be a search engine or similar type of application. In this example, the method can include searching the search engine using the statement as a query and retrieving a set of responsive results (e.g., web pages). In some implementations, each search results can include a uniform resource locator (URL), title, brief description, and other data. In some implementations, other types of content beside web pages may be returned including, without limitation, images, video, audio, etc. In some implementations, a general search engine can be used. Alternatively, or in conjunction with the foregoing, application-specific databases (e.g., corporate databases, proprietary databases, government databases) may be used to retrieve results. These results may form the sources processed in step 212.

In step 212, the method can include scoring and sorting the results of the search performed in step 210. Details on step 212 are provided in FIG. 4 and are not repeated herein. In general, step 212 can include assigning a trustworthiness label or ranking to each of the results, assigning a relevancy score to each result, filtering the results to remove irrelevant results, and providing a sorted list of results for each statement.

In step 214, the method can include labeling the statement based on the sorted sources.

In some implementations, the method can label each statement based on its results (e.g., citations). For example, the method can include labeling an individual statement as trustworthy if its three highest-scoring results (from the sorted list) are all trustworthy. As another example, the method can include labeling the statement as untrustworthy if any of the top three highest-scoring citations for the statement are untrustworthy. As another example, the method can include labeling the statement of unknown trustworthiness otherwise. Alternative mechanisms for aggregating scores from a sorted listed may be used. In some implementations, the labeling in step 214 can comprise a ternary labeling (e.g., trustworthy, untrustworthy, unknown), however other types of labeling (e.g., binary, continuous) may be used.

In some implementations, the method can analyze the entire sorted list of results and apply tuned rules to determine trustworthiness. As one example, the method can count the number of trustworthy results and the number of untrustworthy results and determine which value is higher. If the trustworthy results are high, the statement may be labeled as trustworthy, and vice versa. As another example, some sources may have a higher weight than others and thus may "outweigh" untrustworthy results that support the same statement. Thus, in these scenarios a weighted summation can be used. As yet another implementation, the sorted results may be presented to human editor to allow the human editor to make a determination of whether the associated statement is trustworthy or not.

In some implementations, the labels for the set of texts may vary between users or sets of users, causing different labels for support and veracity for different users for the same input text.

In some implementations, step 214 can optionally include a sub-process that prunes unsupported statements from the generated text. In this sub-process, the method can identify low-ranking results from the list of results and use the statements corresponding to the lowest results as statements to be removed.

In a first implementation, this sub-process can include identifying the text corresponding to statements to be removed. The method can then locate terms in the text of statements to be removed that are referenced via pronoun or more general language later in the text. The method can then replace the references with the terms from the text of statements to be removed. Consider, for example, the statements "Abraham Lincoln once declared that we should not trust what we read on the internet. He later became president." In this case, to remove the first sentence, the method may first replace the "He" in the second sentence by what it refers to: "Abraham Lincoln." Next, the method can remove the text corresponding to the statements to be removed. Finally, the method can smooth out the language remaining by using a language model to remove or replace highly unlikely terms and phrases in text around the removal.

In a second implementation, the method can generate and input a prompt into a generate AI model (e.g., LLM) to answer the original question without making the unsupported statements. The method can then check the new generated text for unsupported statements (using the same sub-process). The method can then repeat until either there is a result without unsupported statements, or some number of repeats have been attempted without success. If no successful outcome is reach, the method can either declare failure or send the result to a human editor for further changes. In a third implementation, the method can transmit the unsupported statements to a human editor to remove unsupported statements and fix the flow of the remaining text. In a fourth implementation, the method can present the user with the generated text and the citations (as described herein), with the trustworthiness scores or labels for the citations. The method can then receive user feedback from the reading user to determine which statements to remove, and how.

In step 216, the method can include determining if any statements identified in step 206 remain. If so, the method can include repeating step 208, step 210, step 212, and step 214 for each remaining statement. If no statements remain, the method can proceed to step 218. When all statements are processed, the method thus obtains a list of results for each statement, the results comprising search results from a search engine. Further, this list is ordered based on its relevance to the statement and includes both a relevancy score as well as a trustworthiness indicator or score. As will be discussed, these results can be used to label the generated text and add citations to the generated text.

In step 218, the method can include labeling the generated text. In some implementations, the label in step 218 can comprise a single label for the entire generated text (e.g., all statements). In some implementations, this label can comprise a categorical label (e.g., trustworthy, untrustworthy, unknown, etc.) or numerical. In some implementations, the label can be selected based on the labels generated for each of the statements. For example, the generated text may be labeled trustworthy if it has any statements labeled untrustworthy, labeled trustworthy if all statements are labeled trustworthy, and labeled of unknown trustworthiness otherwise. Other mechanisms may be used.

In step 220, the method can include transmitting the generated text and one or more labels. In some implementations, the method can transmit a user interface to the user displaying the generated text (and, in some implementations, the original prompt). In some implementations, the method can further display the label determined in step 218 along with the generated text.

In some implementations, the method can further include displaying a control allowing the user to toggle displaying the individual statement labels. In response to a selection of this control, the UI can be updated to display the corresponding statement labels for each statement (generated in step 214). In some implementations, the number of results displayed can be limited to a fixed amount.

In some implementations, a user can further select a statement (or statement label) to display the corresponding citations (i.e., results identified in steps 210 and 212). In response, the UI can display the ranked list of citations in a side panel or other UI element. For example, the method can insert citation numbers in parentheses after statements and add a numbered bibliography of the citations at the end of the generated text. Alternatively, the method may add footnote marks at the end of statements and add the citations as footnotes at the bottoms of pages of the generated text.

In some implementations, the user can select individual results to keep or remove the results as citations for a given statement. In some implementations, the UI can also include controls to allow a user to remove statements from a given generated text. Thus, in some implementations, the user can review the results for a given statement and make their own determination of whether the statement is trustworthy or not. In some implementations, the method can further include generating a second prompt. In some implementations, this second prompt can comprise the original prompt with additional text instructing the LLM to not include any untrustworthy statements identified by the user. In some implementations, this second prompt can be inserted into the LLM and the method of FIG. 2 can be re-executed. In some implementations, this process can be automated, such that the method can determine which statements are untrustworthy (discussed above), then automatically change the prompt to instruct the LLM to remove those statements, and, using that prompt, call the LLM again. In some implementations, after removing a statement the method can include checking whether any statements remain, and whether they are relevant to the original user prompt. If not, the method can request the user to modify their prompt and/or declare failure.

In some of the foregoing implementations, if there is a close match in a trusted result to a statement to be removed, the method can replace the statement to be removed by the close match. In these implementations, the close match can be determined by edit distance between the statement to be removed and a sliding window over the text from a trusted result. Optionally, the method can first use cosine similarity over a BOW representation to narrow down candidates for replacement text, then use edit distance between the candidates and the statement to be removed to determine whether there is a replacement text in the trusted source.

FIG. 3 is a flow diagram illustrating a method for identifying statements in an automatically generated text according to some of the example embodiments.

In step 302, the method can include performing a co-reference resolution.

In some implementations, co-reference resolution refers to the process within NLP that focuses on determining when two or more expressions within a text or discourse refer to the same entity or individual. Examples of such scenarios include pronoun resolution, anaphora resolution, reference resolution, etc.

In some implementations, the co-reference resolution process is designed to enhance the system's understanding and interpretation of the input data by recognizing when different phrases or terms refer to the same concept or entity. This enables the software to maintain continuity and context throughout its operations. For instance, if the generated text includes sentences like "Abraham Lincoln was president. He was born in Kentucky," a successful co-reference resolution process would identify that "Abraham Lincoln" and "he" to the same individual. In some implementations, this step can be carried out using various techniques, including but not limited to, rule-based methods, ML methods, or a combination of both. These techniques analyze linguistic features such as the grammatical role of the words, the semantic relation between the words, the proximity of the words, and the number and gender agreement between the words. In some implementations, step 302 can begin by identifying potential referents, or expressions that could potentially refer to the same entity. Once these potential referents are identified, the method can then analyze the context, syntax, and semantics surrounding these referents to make a final decision regarding which referents actually co-refer.

In step 304, the method can include parsing the text into sentences. In some implementations, this process can include identifying punctuation (e.g., periods, em-dashes) that separate sentences or other coherent phrases. In general, any process which can split a freeform text into a list of sentences or other coherent, independent phrases. In some implementations, step 304 can include splitting compound sentences into simple ones. In some implementations, a rule-based approach can be used (e.g., splitting sentences based on pre-defined punctuation). In other implementations, more advanced techniques such as dependency parsing, semantic role labeling, transformer-based models, or other ML models can be used.

In step 306, the method can select each sentence.

In step 308, the method can include checking the sentence for informational content. As used herein, informational content refers to numbers, names, entities, or similar types of informational (versus tangential) content. In some implementations, various approaches for identifying whether a given sentence includes informational content can be used including named entity recognition (NER), keyword extraction, topic modeling, semantic parsing, transformer/ML models, etc.

In step 310, the method determines if the selected sentences include at least one information item. If so, the method marks the sentences as a statement in step 312. As discussed in FIG. 2, these statements are later processed for trustworthiness. By contrast, if the method in FIG. 3 determines that no information content is present in the sentence the method drops the sentence from the statement list and proceeds to step 314. In step 314, the method re-executes for each remaining sentence and ends after all sentences are analyzed.

FIG. 4 is a flow diagram illustrating a method for identifying citations based on a statement in an automatically generated text according to some of the example embodiments.

In step 402, the method can include receiving results of a search query. In some implementations, this search query can comprise a statement identified in step 206 and selected in step 208 of FIG. 2. Indeed, as discussed, the method of FIG. 4 can be implemented as step 212 and the identification of search results described in FIG. 2 is incorporated herein in its entirety.

In step 404, the method can include classifying the trustworthiness of each of the results based on sources of the results.

In some implementations, a general search engine can be used (as described above). In these implementations, the results from the search can be labeled for trustworthiness based on the source of the results. For example, the method can maintain a list of trusted (and untrusted) sources. The method can then analyze each result and assign a label (or rating) to each result based on these lists. In some implementations, if a result is from a source not on a list the method can default to labeling the result as either untrustworthy or as unknown. In some implementations, the citation rules can be adjusted depending on the audience. For example, the method can allow a user to configure which citation sources are preferred, thus overriding a default list of trusted sites.

However, in other implementations, a tuned search engine can be used. As used herein, a tuned search engine refers to a search engine that only indexes results that are pre-labeled based on their trustworthiness. In some implementations, each document indexed can be labeled. However, in other implementations, entire websites or source of indexed material can be labeled. For example, all documents or other content from a trustworthy newspaper website can be labeled as trustworthy. In some implementations, this labeling can be categorical (e.g., trusted, untrusted, unknown, etc.) or may be continuous (e.g., a "percentage" trustworthy from zero, or untrusted, to one hundred, completely trusted).

As will be discussed, this label can be used in downstream processing when adding citations to an automatically generated text. However, before adding citations, the method can include assigning further scores to each result based not on trustworthiness but on relevancy.

In step 406, the method can include scoring each of the results based on their relevancy to the statement used to retrieve the results.

In some implementations, each result of the search can be assigned a score. In some implementations, the score can comprise a numerical value within a predetermined range. In other implementations, it may be an unbounded numerical value. In general, any technique that can be used to score a relevancy of a result (e.g., document) to a statement (e.g., string) may be used. As one non-limiting example, the method may use a cosine similarity to determine a score for a result. Specifically, the result can be converted into a bag of words (BOW) representation. Then, the method can include determining the relevancy of the BOW representation based on the maximum similarity score between the statement and any section of text in the result, where the section may be either a sentence, a line from a table, or a sliding window of words and numbers in the result that is a multiple of the length of the statement or a fixed length. In some implementations, this similarity can be used as the score.

In step 408, the method can filter the results based on an entailment analysis of the results relative to the statement used to generate the results.

For example, each result can be analyzed to determine if it entails the corresponding statement used to identify the result. For example, a Decoding-enhanced Bidirectional Encoder Representations from Transformers (DeBERTA) model or other NLP method can be used to determine if a given result entails the statement. In some implementations, the output of such a model can be a continuous value that can be used as a score. In other implementations, the output of the model can be a binary value (e.g., yes/no) which can be used as a filter to remove scored (e.g., using cosine similarity, described above) results and limit the size of the results. In this scenario, the similarity scores would remain as the scores. After scoring, the results can be sorted or ordered based on the scores such that the most relevant (e.g., highest scoring) result is listed first in an ordered list.

Figure 5:
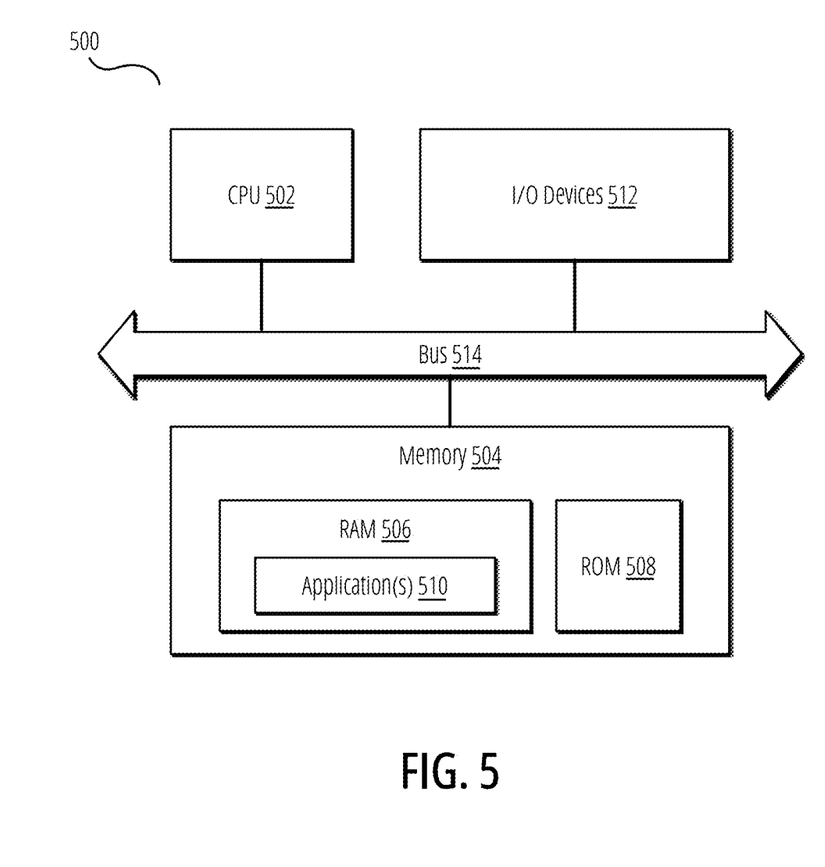
FIG. 5 is a block diagram of a computing device according to some embodiments of the disclosure.

FIG. 5 is a block diagram of a computing device according to some embodiments of the disclosure.

As illustrated, the device 500 includes a processor or central processing unit (CPU) such as CPU 502 in communication with a memory 504 via a bus 514. The device also includes one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 may comprise a general-purpose CPU. The CPU 502 may comprise a single-core or multiple-core CPU. The CPU 502 may comprise a system-on-a-chip (SoC) or a similar embedded system. In some embodiments, a graphics processing unit (GPU) may be used in place of, or in combination with, a CPU 502. Memory 504 may comprise a memory system including a dynamic random-access memory (DRAM), static random-access memory (SRAM), Flash (e.g., NAND Flash), or combinations thereof. In one embodiment, the bus 514 may comprise a Peripheral Component Interconnect Express (PCIe) bus. In some embodiments, the bus 514 may comprise multiple busses instead of a single bus.

Memory 504 illustrates an example of a non-transitory computer storage media for the storage of information such as computer-readable instructions, data structures, program modules, or other data. Memory 504 can store a basic input/output system (BIOS) in read-only memory (ROM), such as ROM 508 for controlling the low-level operation of the device. The memory can also store an operating system in random-access memory (RAM) for controlling the operation of the device.

Applications 510 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device may optionally communicate with a base station (not shown) or directly with another computing device. One or more network interfaces in peripheral devices 512 are sometimes referred to as a transceiver, transceiving device, or network interface card (NIC).

An audio interface in peripheral devices 512 produces and receives audio signals such as the sound of a human voice. For example, an audio interface may be coupled to a speaker and microphone (not shown) to enable telecommunication with others or generate an audio acknowledgment for some action. Displays in peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 may comprise any input device arranged to receive input from a user. An illuminator in peripheral devices 512 may provide a status indication or provide light. The device can also comprise an input/output interface in peripheral devices 512 for communication with external devices, using communication technologies, such as USB, infrared, Bluetooth®, or the like. A haptic interface in peripheral devices 512 provides tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 5, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

parsing, by a processor, a generated text to identify statements included within a generated text;

querying, by the processor, a remote data source to identify sources for each statement in the statements;

determining, by the processor, trustworthiness values for each statement, a trustworthiness value for a given statement determined by computing trustworthiness labels for each source corresponding to a given statement:
   generating, by the processor, a label for the generated text based on an aggregated trustworthiness of each of the statements;
   displaying, by the processor, the generated text and the label within a user interface displayed to a user;
   displaying statement labels for each of the statements, the statement labels representing trustworthiness of each of the statements; and
   detecting a selection of a given statement label and displaying a corresponding list of sources.

2. The method of claim 1, further comprising generating the generated text by inserting a prompt into a large language model (LLM).

3. The method of claim 1, wherein identifying the statements included within the generated text includes:
   parsing the generated text into a set of sentences;
   filtering the set of sentences to identify a second set of sentences that includes informational content; and
   using the second set of sentences as the statements.

4. The method of claim 3, wherein identifying the statements included within the generated text includes performing co-reference resolution on the generated text prior to parsing the generated text.

5. The method of claim 1, wherein identifying a given source in the sources comprises using a corresponding statement as a search query and querying a search engine to obtain a list of search results, the list of search results comprising the sources.

6. The method of claim 1, wherein determining trustworthiness values of each statement comprises:
   classifying a trustworthiness of each source in sources corresponding to the given statement;
   scoring and sorting the sources corresponding to the given statement;
   selecting a top subset of the sources; and
   determining a given trustworthiness value of the given statement based on classified trustworthiness values of each source in the top subset of the sources.

7. The method of claim 6, wherein selecting a top subset of the sources comprises performing an entailment analysis using the given statement and a respective source.

8. A non-transitory computer-readable storage medium for tangibly storing computer program instructions capable of being executed by a computer processor, the computer program instructions defining steps of:
   parsing a generated text to identify statements included within a generated text;
   querying a remote data source to identify sources for each statement in the statements;
   determining trustworthiness values for each statement, a trustworthiness value for a given statement determined by computing trustworthiness labels for each source corresponding to a given statement:
   generating a label for the generated text based on an aggregated trustworthiness of each of the statements;
   displaying the generated text and the label within a user interface displayed to a user;
   displaying statement labels for each of the statements, the statement labels representing trustworthiness of each of the statements; and
   detecting a selection of a given statement label and displaying a corresponding list of sources.

9. The non-transitory computer-readable storage medium of claim 8, the steps further comprising generating the generated text by inserting a prompt into a large language model (LLM).

10. The non-transitory computer-readable storage medium of claim 8, wherein identifying the statements included within the generated text includes:
    parsing the generated text into a set of sentences;
    filtering the set of sentences to identify a second set of sentences that includes informational content; and
    using the second set of sentences as the statements.

11. The non-transitory computer-readable storage medium of claim 10, wherein identifying the statements included within the generated text includes performing co-reference resolution on the generated text prior to parsing the generated text.

12. The non-transitory computer-readable storage medium of claim 8, wherein identifying a given source in the sources comprises using a corresponding statement as a search query and querying a search engine to obtain a list of search results, the list of search results comprising the sources.

13. The non-transitory computer-readable storage medium of claim 8, wherein determining trustworthiness values of each statement comprises:
    classifying a trustworthiness of each source in sources corresponding to the given statement;
    scoring and sorting the sources corresponding to the given statement;
    selecting a top subset of the sources; and
    determining a given trustworthiness value of the given statement based on classified trustworthiness values of each source in the top subset of the sources.

14. The non-transitory computer-readable storage medium of claim 13, wherein selecting a top subset of the sources comprises performing an entailment analysis using the given statement and a respective source.

15. A device comprising:
    a processor; and
    a storage medium for tangibly storing thereon logic for execution by the processor, the logic comprising instructions for:
       parsing a generated text to identify statements included within a generated text;
       querying a remote data source to identify sources for each statement in the statements;
       determining trustworthiness values for each statement, a trustworthiness value for a given statement determined by computing trustworthiness labels for each source corresponding to a given statement:
       generating a label for the generated text based on an aggregated trustworthiness of each of the statements;
       displaying the generated text and the label within a user interface displayed to a user;
       displaying statement labels for each of the statements, the statement labels representing trustworthiness of each of the statements; and
       detecting a selection of a given statement label and displaying a corresponding list of sources.

16. The device of claim 15, wherein identifying the statements included within the generated text includes:
    parsing the generated text into a set of sentences;
    filtering the set of sentences to identify a second set of sentences that includes informational content; and
    using the second set of sentences as the statements.

17. The device of claim 15, wherein identifying a given source in the sources comprises using a corresponding statement as a search query and querying a search engine to obtain a list of search results, the list of search results comprising the sources.

18. The device of claim 15, wherein determining trustworthiness values of each statement comprises:
   classifying a trustworthiness of each source in sources corresponding to the given statement;
   scoring and sorting the sources corresponding to the given statement;
   selecting a top subset of the sources by performing an entailment analysis using the given statement and a respective source; and
   determining a given trustworthiness value of the given statement based on classified trustworthiness values of each source in the top subset of the sources.

* * * * *